United States Patent
Herrmann et al.

(10) Patent No.: US 10,670,114 B2
(45) Date of Patent: Jun. 2, 2020

(54) ACTUATING DRIVE FOR AN AIR DEFLECTOR DEVICE

(71) Applicants: Dr. Ing. h.c. F. Porsche Aktiengesellschaft, Stuttgart (DE); Audi AG, Ingolstadt (DE); SUSPA GmbH, Altdorf (DE)

(72) Inventors: Bernd Herrmann, Ehningen (DE); Joachim Paul, Stuttgart (DE); Sebastian Weber, Esslingen (DE); Steffen Ullrich, Garching (DE); Daniel Spielberg, Nuremberg (DE); Johannes Preis, Bad Abbach/Lengfeld (DE); Bernd Hollerbaum, Creussen (DE); Matthias Glass, Wendelstein (DE); Harald Bielesch, Schnaittach (DE); Johannes Lang, Munich (DE); Marc Feihl, Neuhaus (DE)

(73) Assignees: DR. ING. H.C. F. PORSCHE AKTIENGESELLSCHAFT, Stuttgart (DE); AUDI AG, Ingolstadt (DE); SUSPA GMBH, Altdorf (DE)

( * ) Notice: Subject to any disclaimer, the term of this patent is extended or adjusted under 35 U.S.C. 154(b) by 461 days.

(21) Appl. No.: 15/505,123

(22) PCT Filed: Aug. 18, 2015

(86) PCT No.: PCT/EP2015/068885
§ 371 (c)(1),
(2) Date: Feb. 20, 2017

(87) PCT Pub. No.: WO2016/026828
PCT Pub. Date: Feb. 25, 2016

(65) Prior Publication Data
US 2019/0154117 A1    May 23, 2019

(30) Foreign Application Priority Data

Aug. 22, 2014  (DE) .................. 10 2014 012 292

(51) Int. Cl.
| F16H 1/20 | (2006.01) |
| F16H 1/22 | (2006.01) |
| B62D 35/00 | (2006.01) |

(52) U.S. Cl.
CPC .......... F16H 1/225 (2013.01); B62D 35/007 (2013.01); F16H 1/203 (2013.01); Y02T 10/82 (2013.01)

(58) Field of Classification Search
CPC . F16H 1/20; F16H 1/203; F16H 1/206; F16H 1/22; F16H 1/222; F16H 1/225; F16H 55/22; B62D 35/007; Y02T 10/82
See application file for complete search history.

(56) References Cited

U.S. PATENT DOCUMENTS 2,863,325 A * 12/1958 Eisenberg ............... F16H 1/203
74/425
3,847,032 A * 11/1974 Moser .................... B01D 21/20
74/427

(Continued)

FOREIGN PATENT DOCUMENTS

| CN | 200971116 Y | 11/2007 |
| CN | 201944199 U | 8/2011 |

(Continued)

OTHER PUBLICATIONS

Worm Gears; Published Nov. 6, 2003 by V. Ryan; https://web.archive.org/web/20031106052555/http://www.technologystudent.com/gears1/worm1.htm (Year: 2003).*

(Continued)

*Primary Examiner* — Adam D Rogers
(74) *Attorney, Agent, or Firm* — Leydig, Voit & Mayer, Ltd.

(57) ABSTRACT

An actuating drive for an air deflector device on a vehicle includes a controllable electric motor having an output shaft; a step-down mechanism having a first worm drive and a second worm drive, the first worm drive being coupled by a first worm to the output shaft of the electric motor, the first worm drive having a worm wheel configured to be brought into operative connection with a worm of the second worm drive, the second worm drive having a worm wheel configured to drive the adjustment shaft for the air deflector device; and a mechanical actuating force transmitter configured to transmit an actuating force to the air deflector device.

16 Claims, 1 Drawing Sheet

(56) References Cited

U.S. PATENT DOCUMENTS

| | | | |
|---|---|---|---|
| 4,925,236 A | | 5/1990 | Itoh et al. |
| 5,557,991 A | * | 9/1996 | Brodbeck ............... B25B 17/00 |
| | | | 81/438 |
| 5,570,606 A | | 11/1996 | Irie |
| 5,712,736 A | | 1/1998 | Kogita et al. |
| RE44,158 E | * | 4/2013 | Gleasman ............... F16H 48/29 |
| | | | 407/26 |
| 10,240,663 B2 | * | 3/2019 | Nickel ..................... F16H 1/203 |
| 2004/0256885 A1 | | 12/2004 | Bui |
| 2014/0312155 A1 | | 10/2014 | Lucht et al. |

FOREIGN PATENT DOCUMENTS

| | | | | |
|---|---|---|---|---|
| CN | 203147000 U | | 8/2013 | |
| CN | 203581155 U | | 5/2014 | |
| DE | 3711386 A1 | | 10/1987 | |
| DE | 4323938 A1 | | 1/1994 | |
| DE | 10160056 A1 | | 9/2002 | |
| DE | 10348284 A1 | | 5/2005 | |
| DE | 102008024893 A1 | | 11/2009 | |
| DE | 102010038596 A1 | * | 2/2012 | ............. F16D 7/021 |
| DE | 102013205246 B3 | | 5/2014 | |
| DE | 102018108481 B3 | * | 2/2019 | ........... B62D 35/007 |
| EP | 0685385 B1 | | 9/1998 | |
| EP | 2867109 B1 | | 4/2016 | |
| WO | WO 2008041757 A1 | | 4/2008 | |

OTHER PUBLICATIONS

Machine translation of WO 2008/041757 A1 obtained on Jun. 18, 2019.*

Third Party Comments dated Oct. 14, 2019 with the European Patent Office. pp. 1-29.

\* cited by examiner

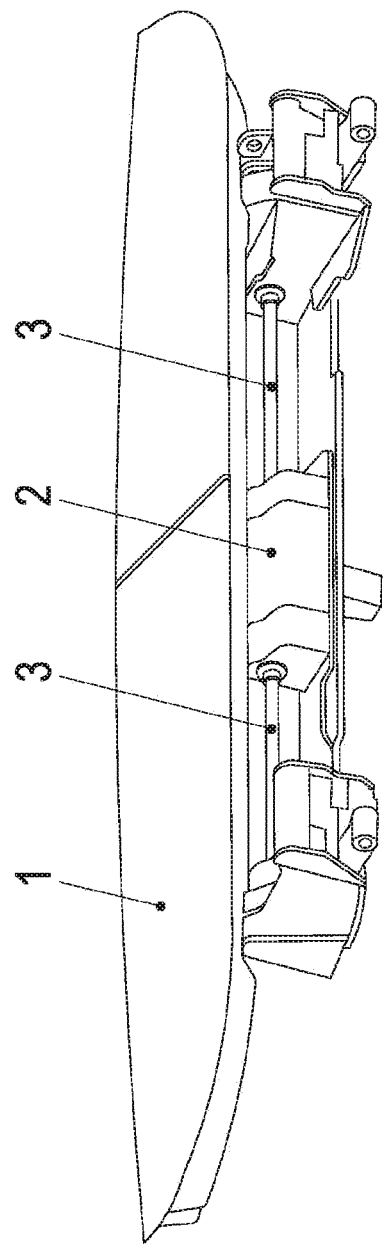
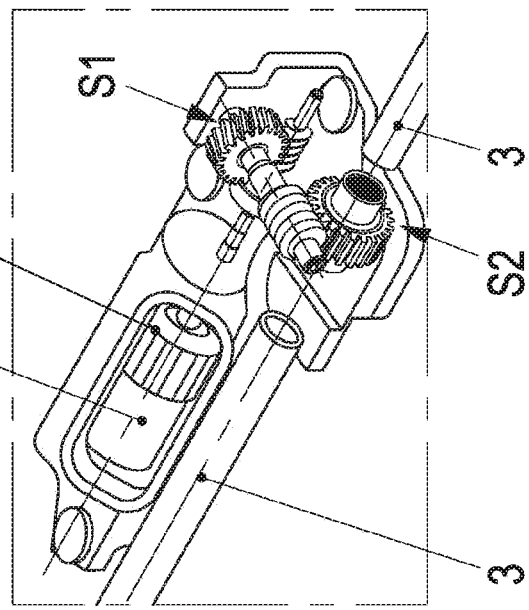
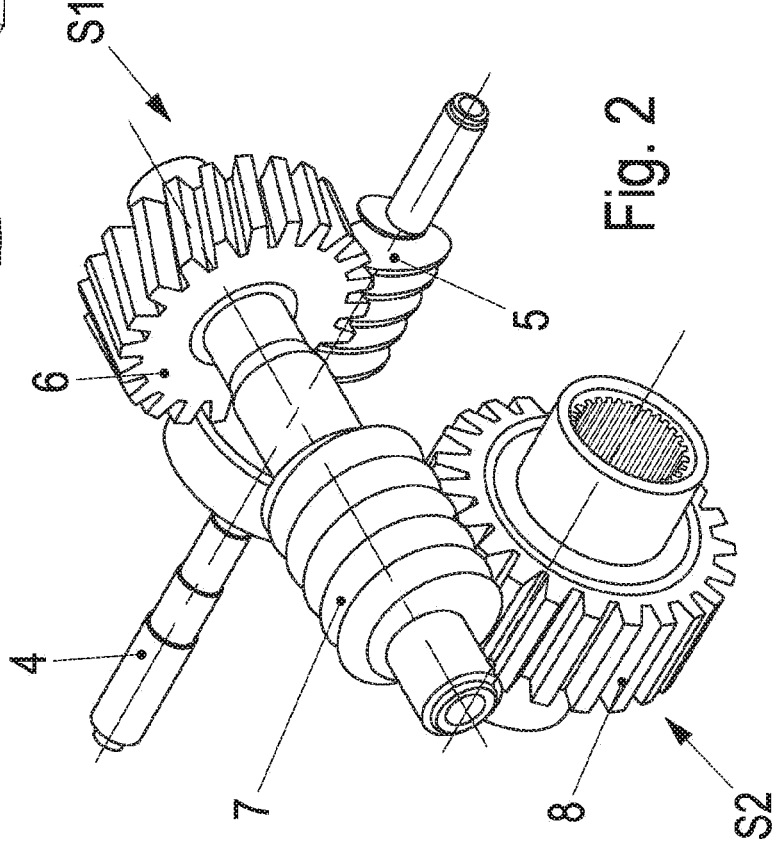

ACTUATING DRIVE FOR AN AIR DEFLECTOR DEVICE

CROSS REFERENCE TO RELATED APPLICATIONS

This application is a U.S. National Phase application under 35 U.S.C. § 371 of International Application No. PCT/EP2015/068885, filed on Aug. 18, 2015, and claims benefit to German Patent Application No. DE 10 2014 012 292.1, filed Aug. 22, 2014. The international application was published in German on Feb. 25, 2016 as WO 2016/026828 A1 under PCT Article 21(2).

FIELD

The invention relates to an actuating drive for an air deflector device, which is adjustable from a non-use position into different use positions, on a vehicle, comprising a controllable electric motor, comprising a step-down mechanism, and also comprising means for mechanically transmitting the actuating force to the air deflector device.

BACKGROUND

In order to increase the downforce or for better road adhesion and overall for improving the road holding quality and for optimum stabilization of the vehicle, air deflector devices are mounted on motor vehicles, in particular on sports vehicles, which air deflector devices can be brought either merely from a non-use position into a use position, but also, under some circumstances, can be brought into a multiplicity of different use positions. The adjustment is customarily performed via an electric motor, preferably a direct current electric motor which is activatable by means of a control device depending on the respectively required settings of the air deflector device. The adjustment of the air deflector device is brought about via a step-down or step-up mechanism connected downstream of said electric motor and via means for mechanically transmitting the actuating force, which is applied by the electric motor, to the air deflector device. The technical requirements imposed on such an actuating drive in modern motor vehicles are relatively high: a relatively simple and highly compact construction which is not prone to faults and has an extremely low weight is required and at the same time an operation which is as quiet or as noise-free as possible is intended to be possible.

A series of solutions are disclosed in the prior art, with which it is attempted to resolve the problems which arise. Thus, DE 103 48 284 A1 discloses an actuating drive for an air deflector device, in particular for a rear spoiler of a vehicle, which actuating drive brings about the adjustment of the rear spoiler with a step-down mechanism, which is driven by the electric motor, via a spindle drive. DE 10 2008 024 893 A1 has disclosed a solution in which the drive device for the air deflector device is intended to be arranged in a manner decoupled from the body of the motor vehicle via a separate mounting element in order to be able to minimize noise.

WO 2008/041757 A1 has disclosed an actuating drive device, in which an air deflector device is intended to be extended or retracted via a centrally arranged step-up mechanism, which is driven by the electric motor, and an adjustment shaft, which is driven by said step-up mechanism, via racks which interact with gearwheels on the adjustment shaft.

DE 37 11 386 A1 and U.S. Pat. No. 4,925,236 disclose actuating drives for air deflector devices, in which the electric motor brings about the adjustment of the air deflector device via a worm and a worm wheel and partially via further gear elements. These solutions are clearly based on the finding that high to very high stepping-down can be achieved with worm drives and that worm drives belong to the gear devices having the least production of noise. In addition, worm drives are generally self-locking.

DE 43 23 938 shows and describes an air deflector device, which is combined with a rear view mirror device, for a vehicle. In this system, two worm/worm wheel drives are combined in order to be able to ensure the synchronization of the movements of air deflector device and rear view mirror device.

SUMMARY

In an embodiment, the present invention provides an actuating drive for an air deflector device on a vehicle, the air deflector device being adjustable from a non-use position into different use positions, the actuating device including a controllable electric motor having an output shaft; a step-down mechanism having a first worm drive and a second worm drive, the first worm drive being coupled by a first worm to the output shaft of the electric motor, the first worm drive having a worm wheel configured to be brought into operative connection with a worm of the second worm drive, the second worm drive having a worm wheel configured to drive an adjustment shaft for the air deflector device; and a mechanical actuating force transmitter configured to transmit an actuating force to the air deflector device.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 shows an air deflector device schematically with a centrally arranged actuating drive according to an embodiment of the invention;

FIG. 2 shows the design of the step-down mechanism of an actuating drive according to an embodiment of the invention; and FIG. 3 shows an overall view of an actuating drive constructed according to an embodiment of the invention.

DETAILED DESCRIPTION

An actuating drive is described herein for an air deflector device that is distinguished by a highly compact and weight-saving construction with minimal production of noise and which can dispense with the use of additional positioning or fixing elements for the different positions of the air deflector devices.

An actuating drive is described herein having a step-down mechanism having a first worm drive which is coupled via its worm to the drive shaft of the electric motor and the worm wheel of which can be brought into operative connection with a worm of a second worm drive, the worm wheel of which drives the adjustment shaft for the air deflector device.

The first worm drive here is preferably stepped up to a smaller extent than the second worm drive, wherein, in an expedient refinement of the subject matter of the invention, the transmission ratio of the second worm drive to the first worm drive can be approximately 2:1.

An actuating drive according to an embodiment of the invention preferably manages with a drive unit—even when air deflector devices are relatively protruding and, under some circumstances, are much heavier; in particular whenever the worm wheel of the second worm drive is arranged approximately centrally on the adjustment shaft driven by said worm drive. A central arrangement of the actuating drive and therefore a uniform transmission, in every relationship, of the adjustment forces to the adjustment means, which are generally arranged laterally on the outside, for the air deflector device are achieved.

With an actuating drive according to an embodiment of the invention, very varied air deflector devices can be driven. However, said actuating drive is particularly suitable, for example, for the "rear spoiler" of vehicles, in particular of motor vehicles.

FIG. 1 shows an air deflector device 1, a spoiler blade which is extendable into any desired positions with respect to a motor vehicle, or a "rear spoiler", which can be arranged, for example, in the rear region of a sports vehicle. Such an air deflector device 1 is adjustable at least between a use position, in which it is extended from the body contour of the vehicle into a raised position, and a non-use position, in which it is retracted in an approximately shape-matching manner into vehicle body parts surrounding it, or is brought into at least one position having little or no influence on the airflow. This adjustment movement is brought about via a drive device 2. Said drive device 2 is customarily constructed from an electric motor and a step-down mechanism interacting with the electric motor. The step-down mechanism acts on an adjustment shaft (or shafts) 3 which interacts with means for mechanically transmitting the actuating force, which originates from the drive device 2, to the air deflector device 1. Said means for mechanically transmitting the actuating force are known in a manner known per se from the prior art; they will not be discussed in more detail here as they do not belong to the subject matter of the invention.

FIG. 2 illustrates the actuating drive according to an embodiment of the invention in more detail: a worm 5 of a first worm drive S1 is driven via the output shaft 4 of the electric motor. The worm 5 interacts with a worm wheel 6 which drives the worm 7 of a second worm drive S2. In order to reduce the torsional backlash of the output shaft 4, the intermediate shaft, defined inter alia via the components 6 and 7, is pretensioned by means of spring elements. The worm 7 operates on a worm wheel 8 via which the adjustment shaft 3 is driven—directly or indirectly—or, if the actuating drive is arranged centrally, the adjustment shafts 3 emerging on both sides are driven.

In order to be able to optimally use the advantages of the use of a worm drive for such an actuating drive, it is expedient to select step-up or step-down ratios for the first worm drive of the order of magnitude of approx. 10 and for the second worm drive of the order of magnitude of approx. 23. In each case, the second worm drive is intended to be stepped up in a ratio of approximately 2:1 to the first worm drive. With such a step-up or step-down ratio, first of all the greatest possible self-locking is achieved in the gear mechanism, and therefore the air deflector device remains unchangeable in every desired position without additional positioning or locking means and even at higher speeds of the vehicle or at higher wind pressures; secondly, a scarcely perceptible production of noise can therefore also be realized.

FIG. 3 shows schematically the arrangement of the actuating drive according to FIG. 2 with respect to the electric motor 9 driving said actuating drive, and also the adjustment shaft(s) 3 which lead to the mechanical actuating devices for the air deflector device. The electric motor 9 is completely elastically decoupled here, for example via special couplings or decoupling elements 10 made of rubber, which are each provided on the end side of the electric motor 9.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

S1 First worm drive
S2 Second worm drive
1 Air deflector device (rear spoiler)
2 Drive device
3 Adjustment shaft
4 Output shaft
5 Worm
6 Worm wheel
7 Worm
8 Worm wheel
9 Electric motor

The invention claimed is:

1. A motor vehicle actuating drive for adjusting a motor vehicle air deflector device from a non-use position into different use positions, the motor vehicle actuating drive comprising:
 a controllable electric motor having an output shaft; and
 a step-down mechanism having a first worm drive and a second worm drive, the first worm drive being coupled by a first worm to the output shaft of the electric motor, the first worm drive having a worm wheel configured to be brought into operative connection with a worm of the second worm drive, the second worm drive having a worm wheel configured to drive an adjustment shaft for the air deflector device,
wherein the adjustment shaft is configured to transmit an actuating force generated by the electric motor toward the air deflector device, and
wherein the electric motor is elastically decoupled from the step-down mechanism.

2. The motor vehicle actuating drive as claimed in claim 1, wherein the first worm drive is stepped up to a smaller extent than the second worm drive.

3. The motor vehicle actuating drive as claimed in claim 2, wherein the second worm drive is stepped down approximately in a ratio of 2:1 to the first worm drive.

4. The motor vehicle actuating drive as claimed in claim 1, wherein the worm wheel of the second worm drive is arranged approximately centrally to or on the adjustment shaft driven by the second worm drive.

5. The motor vehicle actuating drive as claimed in claim 1, wherein the air deflector device is a rear spoiler of a motor vehicle.

6. The motor vehicle actuating drive as claimed in claim 1, wherein the electric motor and the step-down mechanism are disposed within a common housing, the common housing defining a pair of bores through which the adjustment shaft extends.

7. The motor vehicle actuating drive as claimed in claim 1, wherein the step-down mechanism comprises an intermediate shaft on which the worm wheel of the first worm drive and the worm of the second worm drive are fixed.

8. The motor vehicle actuating drive as claimed in claim 1, wherein the electric motor is elastically decoupled from the step-down mechanism via decoupling elements made of rubber.

9. The motor vehicle actuating drive as claimed in claim 1, wherein a first transmission ratio of the first worm drive and a second transmission ratio of the second worm drive collectively operate to lock the air deflector device in position when a vehicle is operating.

10. The motor vehicle actuating drive as claimed in claim 9, wherein the air deflector device is exclusively locked in position by a collective impact of the first and second transmission ratios.

11. The motor vehicle actuating drive as claimed in claim 10, wherein the worm wheel of the first worm drive and the worm wheel of the second worm drive are each toothed around a respective complete outer circumference.

12. A motor vehicle actuating drive for adjusting a motor vehicle air deflector device from a non-use position into different use positions, the motor vehicle actuating drive comprising:
a controllable electric motor having an output shaft and
a step-down mechanism having a first worm drive and a second worm drive, the first worm drive being coupled by a first worm to the output shaft of the electric motor, the first worm drive having a worm wheel configured to be brought into operative connection with a worm of the second worm drive, the second worm drive having a worm wheel configured to drive an adjustment shaft for the air deflector device,
wherein the worm wheel of the first worm drive and the worm wheel of the second worm drive are each toothed around a respective complete outer circumference,
wherein the adjustment shaft is configured to transmit an actuating force generated by the electric motor toward the air deflector device, and
wherein the electric motor is elastically decoupled from the step-down mechanism.

13. The motor vehicle actuating drive as claimed in claim 12, wherein the electric motor is elastically decoupled from the step-down mechanism via decoupling elements made of rubber.

14. The motor vehicle actuating drive as claimed in claim 13, wherein the electric motor and the step-down mechanism are disposed within a common housing, the common housing defining a pair of bores through which the adjustment shaft extends.

15. The motor vehicle actuating drive as claimed in claim 14, wherein the second worm wheel is disposed at a center of the adjustment shaft.

16. The motor vehicle actuating drive as claimed in claim 15, wherein the step-down mechanism comprises an intermediate shaft on which the worm wheel of the first worm drive and the worm of the second worm drive are fixed.

* * * * *